Figure 1:
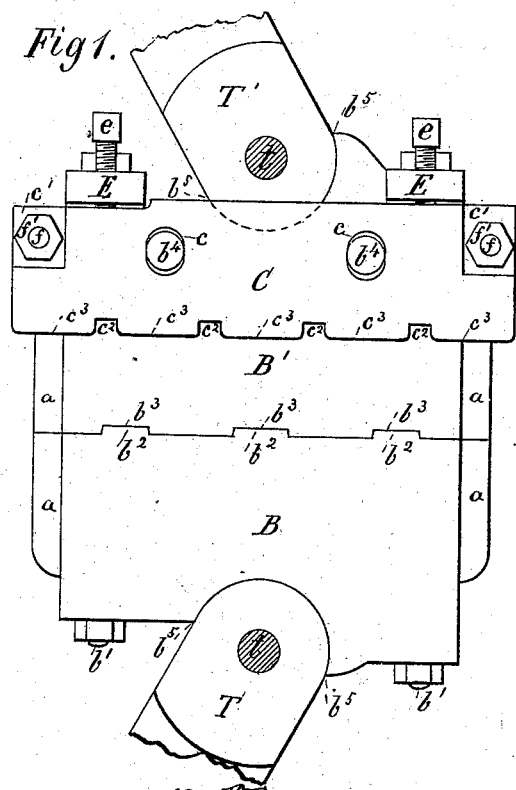

(No Model.)

R. H. BUTLER.
Nut for Power Screws of Presses.

No. 239,721.  Patented April 5, 1881.

Witnesses:

Inventor:
Reas H. Butler

United States Patent Office.

REES H. BUTLER, OF ATLANTA, GEORGIA, ASSIGNOR OF ONE-HALF TO ER LAWSHÉ, OF SAME PLACE.

NUT FOR POWER-SCREWS OF PRESSES.

SPECIFICATION forming part of Letters Patent No. 239,721, dated April 5, 1881.

Application filed January 11, 1881. (No model.)

*To all whom it may concern:*

Be it known that I, REES H. BUTLER, a citizen of the United States, residing at Atlanta, in the county of Fulton and State of Georgia, have invented a new and useful Improvement in Nuts for Power or Main Screws of Presses, and for other screws, of which the following is a specification.

My invention consists, first, in a nut for a power or other screw of presses and other machines, made in sections longitudinally, and composed of internal lining portions and external backing or housing portions, the internal portions being of durable metal, such as gun-metal, for instance, and having the screw-thread of the nut cut or cast on them, and the external backing portions or housing being of ordinary cast or wrought metal, and the whole made with suitable interlocking parts and bolted together, as will be presently described. By this construction the durability of nuts is increased, as the gun-metal lining affords a screw-thread which is very solid, tenacious, and free from flaws, and which is not as liable as ordinary cast or wrought iron screw-threads to be stripped from its foundation or backing metal. The nut being made in two halves admits of the upper half of the screw-threaded lining being taken out of its backing or housing and a new screw-threaded portion exchanged therefor; and the same thing can be done with respect to the lower half of the screw-threaded lining; or the upper half of the screw-threaded lining can be exchanged for the lower half, or the reverse of this can be done. And in the event of the nut wearing greatest at its upper rear portion and its lower front portion, the screw-threaded halves can be reversed end for end. Thus a nut is produced which, in the first instance, is more durable, and which, when its screw-thread is wholly worn out, can be repaired by simply exchanging new screw-threaded linings for the worn ones, and the necessity of throwing aside the backing, as well as the screw-threaded portion of the nut, is avoided—an impossibility where the backing or housing and screw-thread are cast in one piece; and a nut is also produced which can have its unequally or irregularly worn screw-thread set so as to insure a proper hold or bearing for the thread of the main or power screw.

My invention consists, second, in the separate solid backing or housing portions of the nut, connected to the toggle-levers and interlocked by transverse ribs and grooves, in combination with the lining screw-threaded portions of the nut interlocked with the backing portions by transverse ribs and grooves, the said backing and lining portions being united by screw-bolts passed through the backing portions near their corners.

My invention consists, third, in the employment of riders on the sides of the nuts, said riders having their bearing-surfaces grooved or channeled transversely and chilled, and being arranged to slide upon the tracks or guides of the press, and made adjustable up and down, and movable inward and outward with respect to the tracks and the nuts, whereby the nuts are kept in a true position and the power-screw is prevented from bending under great strain, and whereby the very nicest adjustment of the nuts with respect to the power-screw, and of both the nuts and screw to the tracks or guides, can be effected, and whereby, also, a flat sliding bearing, which is very durable under great friction, is secured, and whereby the amount of surface-contact between the riders and the tracks is distributed upon long riders in a manner to give greater support to the screw without actually increasing the extent of bearing or friction surface.

My invention consists, fourth, in the means whereby the nuts can be trained and leveled with respect to the screw of the press, and the training-screws thereafter relieved of the strain which comes upon the nuts and other parts.

Figure 2:
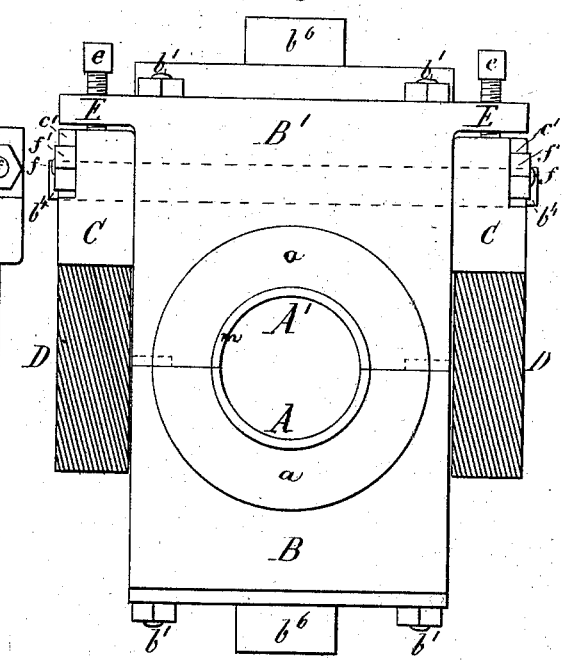
Figure 3:
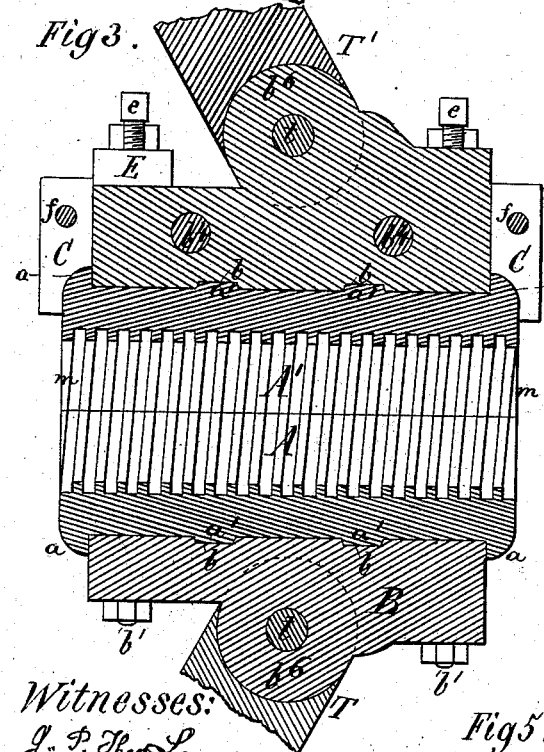
Figure 4:
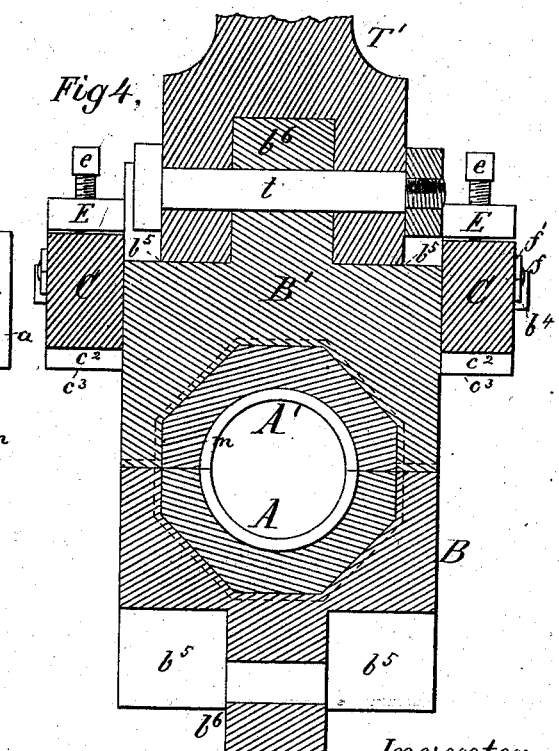
Figure 5:
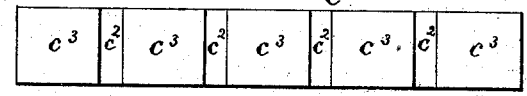

In the accompanying drawings, Figure 1 is an elevation of one of the nuts of a toggle-joint screw-press as improved by me, the pivot-bolts of the toggle-levers being shown in transverse section. Fig. 2 is an end view of Fig. 1, the toggle-levers being removed, and guides or tracks for the riders of the nuts of a press being shown in transverse section. Fig. 3 is a vertical longitudinal central section of Fig. 2, showing end portions of the toggle-levers. Fig. 4 is a transverse vertical section of the same, showing an end portion of the upper toggle-lever. Fig. 5 is a bottom view of one of the riders of the nut.

Similar letters refer to similar parts throughout the several figures.

A A' and B B' represent my improved sectional nut, A A' representing the metal lining on which the screw-thread is formed, and B B' the backing or housing of the screw-threaded lining.

C are the riders; D, the tracks or guides of a press, and T T' the lower and upper levers of a toggle-joint.

The nut, as shown, is made in two equal sections or halves, and the parts or surfaces with which the lining portions A A' come in contact are all of the same size and shape, both as regards the upper and lower halves, so that the lower-half lining can be exchanged for the upper half-lining, or the upper half-lining for the lower-half lining, and this without any special fitting of the parts. On each half-lining half-collars $a$ are provided, and between these collars half-ribs $a'$ are formed upon the outside of the linings. The lining-pieces A A', when united together, are in transverse section, polygonal in form, and the ribs $a'$ are of corresponding form. The backing or housing portions B B' are, when united, of polygonal form internally, and square or other form externally. Between the ends of the housing portions B B' grooves or channels $b$, corresponding to the ribs $a'$, are provided on the inside of the housing to receive the said ribs, as shown. By means of the collars $a$ and the ribs $a'$ the lining portions A A' are prevented from moving longitudinally in the housing portions B B' when great strain from the power-screw comes upon the threads of the nuts of a press; and by the polygonal form of the inside of the housing and the corresponding form of the exterior of the lining the lining is kept from moving around with the power-screw when the press is being operated.

The lining halves are composed of the very best and most durable metal—gun-metal, for instance—and the screw-thread $m$ thereof may be formed by casting this metal on a screw as a mold, or by cutting the threads in the metal with a lathe, the latter being the preferable mode. The housing portions B B' are provided with ribs and grooves $b^2$ $b^3$ on those surfaces where the two half-sections adjoin. The ribs $b^2$ fit into the corresponding grooves $b^3$, and by this means the parts of the housing are prevented from moving longitudinally upon each other when great strain comes upon the nuts of the press. The linings A A' and the housings B B' are held firmly together by screw-bolts $b'$, passed through the housing portions, near the four corners thereof, as shown in the drawings.

On each side of the upper portion, B', of the housing ends of steel pins $b^4$ project to an extent equal to the thickness of the riders C, and these ends of said pins pass through oblong holes $c$ in the riders, so that they bear against the metal of the riders in a direction lengthwise of the riders, but not in a direction up and down. These ends of the pins thus serve to prevent the riders moving independently of the nut in a longitudinal direction, but do not interfere with an up-and-down adjustment of the riders. In fact, their office is to admit of such up-and-down adjustment, as will be presently seen. The riders are connected together by screw-bolts $f$, provided with nuts $f'$, which are seated in recesses $c'$ at the ends of the riders, in order to offer no obstruction. By means of the screw-bolts they are held firmly against the sides of the nut, and they may, by means of said bolts, be slackened in order to permit any necessary adjustment of the nut to the power-screw of the press.

The upper portion, B', of the housing is provided with corner lugs E overhanging the riders, and through these lugs set-screws $e$ are passed and made to come in contact with the riders. By means of the set-screws and the oblong holes $c$ the operator is enabled to level and train the nut with respect to the screw, and when it is found that the riders and other parts are properly adjusted small metal blocks of proper thickness are inserted between the lugs E and riders C, after the set-screws are screwed back out of the way, or before, if the pieces of metal be of U or horseshoe shape; and in this manner the set-screws are relieved from bearing the great strain which comes upon the nut, and they can be thus kept in order for future adjustments.

The guides D may be of ordinary construction and arrangement; but the riders should have their metal bearing-surfaces act as slides, and these surfaces should be of considerable length, but so divided up into a number of short bearing portions, $c^3$, that while the proper sustaining action to the power-screw is afforded the frictional contact shall not be too great. To this end I have constructed the riders, as signified in Figs. 1 and 5, with chilled projecting or bearing portions $c^3$, and with channeled non-bearing portions $c^2$, and by this means friction is reduced and durability insured, and at the same time a sufficient length of slide obtained for preventing the screw of the press "buckling" or bending out of true.

From the foregoing specification it will be seen that the invention I have made enables me to make the nuts of screw-presses with housing or backing portions B B' of cheaper metal than that which is employed for the screw-threaded lining portions A A', of cast or wrought iron or steel, for instance, and that these housing portions may be provided with suitable socket-bearings, $b^5$, to receive the ends of the toggle-levers T T', and with lugs $b^6$, through which the pivot-bolts $t$ of the said levers pass, as shown.

The great advantage of my invention is this: where the nuts, as heretofore constructed, must be wholly thrown away when worn out or impaired, with my nut it is only necessary to exchange new screw-threaded linings for the worn-out ones, and this can be effected by separating the two parts B B' of the housing, to do which the bolts b' are simply removed. In many cases a nut which will not operate well can be made perfectly effective by simply interchanging the respective halves of the screw-threaded portions A A', one for the other, or by reversing the sections end for end.

The interchange of the halves is practical when it is found that the wear of the linings is more upon one half than upon the other, and should the wear of the nut be on the upper front end of one half and the lower rear end of the other the proper bearing can be secured by reversing the halves of the lining, end for end, as above stated. In making the interchanges or in repairing the nut the toggle-levers may remain connected with the halves of the housing or backing B B', the same as with press-nuts as heretofore devised, which are made of two halves and have their screw-threaded portion and the bases thereof made of homogeneous metal, but with this advantage over such nuts—viz., that in no case is it necessary with my construction to detach the backing or housing, or to suffer the expense of the renewal thereof when the screw-thread is worn out or impaired; whereas with the two-part nuts, heretofore devised, it is necessary not only to detach the bases of the screw-threads, when the said threads become worn or impaired, but also to throw away with the thread one-half of the backing, or the whole, as the case may be, and to substitute the same by new halves or whole nuts, consisting of screw-threads and the bases thereof.

What I claim as my invention, and desire to secure by Letters Patent, is—

1. The combination, in a nut, of the housing or backing portions B B', provided with interlocking devices $b^2$ $b^3$, the screw-threaded portions A A', provided with ribs $a'$, which enter grooves $b$ of the housing portions, and the uniting-bolts $b'$, substantially as and for the purpose described.

2. The combination of the toggle-levers T T', the housing or backing portions B B' of the nut, provided with interlocking devices $b^2$ $b^3$, and the screw-threaded portions A A' of the nut, provided with ribs $a'$, which fit grooves $b$ of the housing portions, and the uniting-bolts $b'$, substantially as and for the purpose described.

3. The sliding riders, made adjustable vertically, in combination with the nut, substantially as and for the purpose described.

4. The sliding riders, having their surfaces elongated, grooved, and chilled, substantially as and for the purpose described.

5. The combination of the housing portion B', riders C, having oblong holes $c$, pins $b^4$, and set-screws $e$, substantially as and for the purpose described.

REES HELM BUTLER.

Witnesses:
 W. L. BANKS,
 J. B. JOBSON.